United States Patent
De Nicolo et al.

(10) Patent No.: US 11,547,236 B2
(45) Date of Patent: Jan. 10, 2023

(54) BREWING DEVICE FOR A MACHINE FOR PREPARING BEVERAGES, IN PARTICULAR COFFEE OR TEA

(71) Applicant: CARIMALI S.P.A., Bergamo (IT)

(72) Inventors: Michele De Nicolo, Concorezzo (IT); Alessandro Merati, Chignolo d'Isola (IT); Massimo Pelletta, Viguzzolo (IT)

(73) Assignee: Carimali S.P.A., Bergamo (IT)

( * ) Notice: Subject to any disclaimer, the term of this patent is extended or adjusted under 35 U.S.C. 154(b) by 453 days.

(21) Appl. No.: 16/623,021

(22) PCT Filed: Jun. 27, 2018

(86) PCT No.: PCT/IB2018/054766
§ 371 (c)(1),
(2) Date: Dec. 16, 2019

(87) PCT Pub. No.: WO2019/003147
PCT Pub. Date: Jan. 3, 2019

(65) Prior Publication Data
US 2020/0268197 A1 Aug. 27, 2020

(30) Foreign Application Priority Data

Jun. 27, 2017 (IT) .................. 102017000071902

(51) Int. Cl.
*A47J 31/52* (2006.01)
*A47J 31/36* (2006.01)

(52) U.S. Cl.
CPC ......... *A47J 31/525* (2018.08); *A47J 31/3604* (2013.01); *A47J 31/521* (2018.08)

(58) Field of Classification Search
CPC ..... A47J 31/521; A47J 31/525; A47J 31/3604
(Continued)

(56) References Cited

U.S. PATENT DOCUMENTS

2016/0176625 A1 6/2016 Brockman et al.
2016/0287007 A1 10/2016 Barnett

FOREIGN PATENT DOCUMENTS

EP 0627186 A1 12/1994
EP 2658421 A1 11/2013
(Continued)

OTHER PUBLICATIONS

International Search Report dated Oct. 24, 2018 for PCT application No. PCT/IB2018/054766.
(Continued)

*Primary Examiner* — Toan C Ly
(74) *Attorney, Agent, or Firm* — Ruggiero McAllister & McMahon LLC

(57) ABSTRACT

The present disclosure is for an electronic control system for a brewing device for a machine for preparing beverages, in particular coffee or tea. The brewing device comprises a brewing chamber having an opening through which a material to be brewed may be loaded and discharged; a closing body movable away from and towards a sealed closing position of the opening angularly spaced apart from the closing position, through an intermediate ejection position, in which the closing body is raised with respect to the closing position along the longitudinal axis of the brewing chamber; a piston slidably mounted in the brewing chamber in a position axially opposite the closing body; a first electric actuating device for the movement of the closing body; and a second electric actuating device for the movement of the piston. The electronic control system is configured to be arrangeable in the brewing device and comprises a sensory system configured to output electrical signals to allow the reaching, by the closing body, of the opening, closing and ejection positions to be sensed, and the axial position of the piston in the brewing chamber to be determined, and an on-board electronic control unit configured to be connect- (Continued)

able to the sensory system to receive electrical signals therefrom, to the first and second electric actuating device to supply electrical control signals thereto, and to an electronic control unit of the beverage preparation machine external to the brewing device to receive therefrom commands relating to the operation of the brewing device. The on-board electronic control unit is further configured to execute commands received from the external control unit to responsively output, also based on the electrical signals received from the sensory system, electrical control signals for the electric actuating devices.

9 Claims, 13 Drawing Sheets

(58) Field of Classification Search
USPC .......................................................... 99/283
See application file for complete search history.

(56) References Cited

FOREIGN PATENT DOCUMENTS

| WO | 2009140349 A2 | 11/2009 |
|----|---------------|---------|
| WO | 2013127476 A1 | 9/2013 |
| WO | 2017089337 A1 | 6/2017 |

OTHER PUBLICATIONS

Written Opinion dated Oct. 24, 2018 for PCT application No. PCT/IB2018/054766.

BREWING DEVICE FOR A MACHINE FOR PREPARING BEVERAGES, IN PARTICULAR COFFEE OR TEA

CROSS-REFERENCE TO RELATED PATENT APPLICATIONS

This patent application claims priority of Italian patent application No. 102017000071902 filed on 27 Jun. 2017, the content of which is incorporated herein by reference.

TECHNICAL FIELD OF THE INVENTION

The present invention relates to a brewing device for a machine for preparing beverages, in particular coffee or tea.

STATE OF THE ART

Machines for preparing beverages, in particular coffee or tea, are known in the prior art, which are provided with a brewing device comprising a brewing chamber having an opening through which a material to be brewed may be loaded and discharged; one or more members operable to cooperate with the brewing chamber to prepare beverages; one or more electric actuators operable to mutually move the members and the brewing chamber to prepare beverages; and an electronic control system comprising a sensory system to output electrical signals that allow relative position of one or more of the members and of the brewing chamber during a beverage preparation cycle to be determined; and an on-board electronic control unit connected to the sensory system to receive the electrical signals therefrom, and to each of the electric actuators to supply electrical control signals thereto.

A machine for preparing beverages of the above-mentioned type is known for example from WO 2013/127476 A1.

SUBJECT-MATTER AND SUMMARY OF THE INVENTION

The Applicant has experimentally experienced that the brewing devices of the above-mentioned type are affected by a number of problems that may be grouped in two major categories: one regarding the electric actuation of the closing body, and one regarding the on-board sensory system.

With regard to the problems concerning the electric actuation of the closing body, the Applicant has experimentally experienced that these are fundamentally caused by the production deviations, which may result in such a wide electric current absorption ranges in the electric actuation as to make characterisation and use of the latter quite difficult.

In particular, the brewing apparatuses of the above-mentioned type have two mechanical stops at a brewing chamber opening position to allow the brewing material to be loaded and at a brewing chamber closing position to allow the brewed beverage to be prepared and dispensed.

The Applicant has further experimentally experienced occurrence of frequent malfunctions of the brewing devices due to the fact that the production deviations result in new brewing devices having different mechanical behaviour from more well-run brewing devices, due to mechanical rebounds or to collateral mechanical rigidity, and in different batches of electric motors behaving differently from others due to electric absorptions significantly different from characterisation.

For these reasons, the brewing devices of the above-mentioned type are frequently subject to early interruptions of the movement of the closing body that result in the targeted positions failing to be reached.

The Applicant has further experimentally experienced that in the brewing devices of the above-mentioned type the specified problems cannot be easily solved acting on the current thresholds, but require introduction in the control software of a large number of patches that enable the closing body to be unlocked and positions to be restored when incorrect positioning is detected, which, in addition to worsening timing of the dispensing cycle, significantly burden the control software and, consequently, exploitation of the required computational resources.

On the other hand, with regard to the problems concerning the on-board sensory system, the Applicant has experimentally experienced that these are basically caused by an incorrect placement of the sensors in the brewing device.

In fact, in the brewing device of the above-mentioned type the various positions of the closing body are sensed through two Hall effect sensors arranged on the head of the brewing device, at the opening of the brewing chamber, so as to identify the passage of four magnets mounted on one of the two disc cams arranged on opposite sides of the brewing chamber.

Given that some of the positions of the closing body recur during its movement, the different electrical current absorptions of the electric actuators of the closing body caused by the production deviations, along with the above-mentioned positioning of the Hall effect sensors, result in positions of the closing body that do not correspond to the actual ones being frequently sensed.

Finally, the Applicant has further experienced that, in addition to the above-mentioned problems, the brewing devices of the above-mentioned type suffer from a number of technical constraints attributable to the control electronics, both in terms of components used and of architecture, the major constraint being the difficulties linked to the interchangeability of the brewing device with other ones of different type or of the same type but more modern, which interchangeability requires significant electrical and electronic modifications, such as electrical matchings and/or supplementary electronic circuit boards.

Purpose of the present invention is to provide a brewing device of the above-mentioned type and which introduces improvements that allow to at least partly overcome the above-mentioned problems and constraints.

According to the present invention, an electronic control system for a brewing device in a machine for preparing beverages, in particular coffee or tea, a brewing device comprising such an electronic control system, and a machine for preparing beverages comprising such a brewing device are provided, as claimed in the appended claims.

DETAILED DESCRIPTION OF PREFERRED EMBODIMENTS OF THE INVENTION

A detailed description of this invention will now be given with reference to the enclosed Figures to allow a person skilled in the art to implement it and use it. Persons skilled in the art will be able to implement various modifications to the embodiments described herein and the general principles disclosed herein could be applied to other embodiments and applications without departing from the scope of the present invention, as disclosed in the appended claims. Accordingly, the present invention is not to be limited in scope to the embodiments described and illustrated herein, but is to be accorded with the widest scope consistent with the principles and characteristics disclosed and claimed herein.

Figure 1:
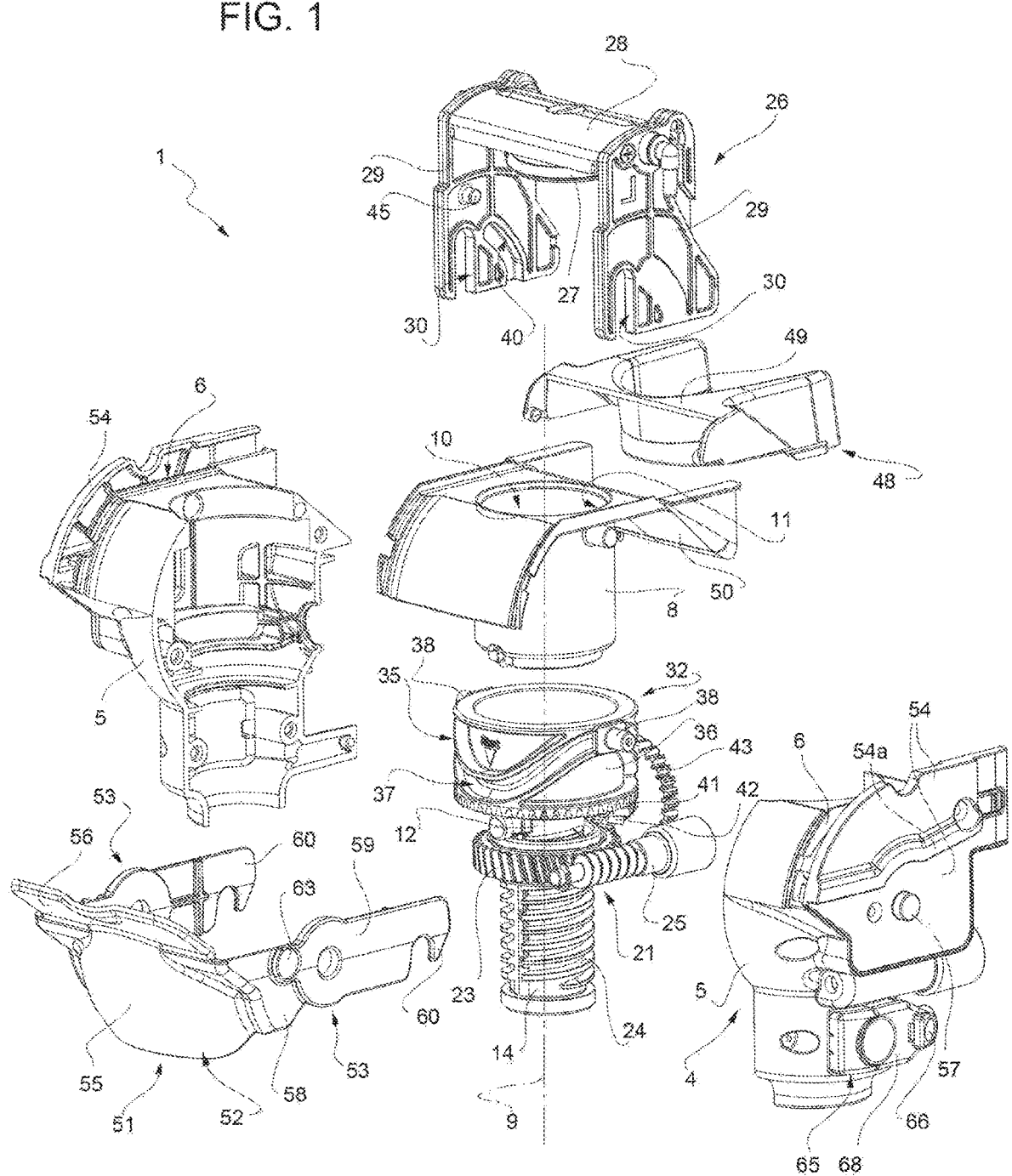
FIG. 1 is an exploded view of a preferred embodiment of the brewing device according the present invention.

FIG. 1 shows, as a whole, a brewing device for preparing beverages, in particular coffee or tea, through a pressurized hot water extraction process in a beverage preparation machine.

Under normal operating conditions, the brewing device 1 is arranged in the beverage preparation machine and is connected to a pressurised hot water source and an automatic supply device operable to provide to the brewing apparatus 1, at the beginning of a brewing cycle, a dose of material to be brewed, for example coffee powder or tea leaves. In a variant, material may be supplied manually by loading, by a user, of either a dose of loose material or a known single-serve pod or capsule.

Figure 2:
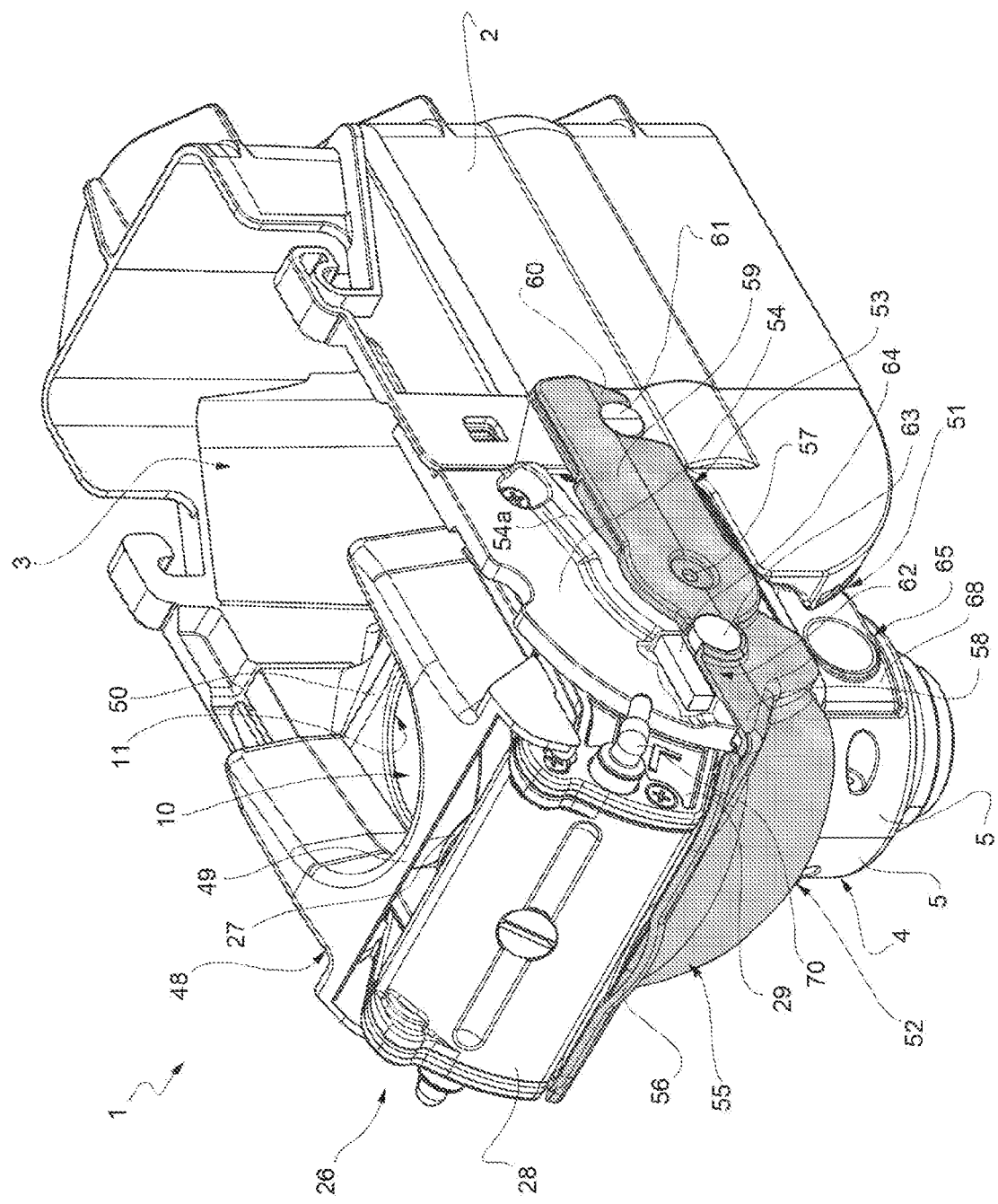
FIG. 2 shows a perspective view the brewing apparatus of FIG. 1 arranged in an open configuration and mounted on a support which is part of a machine for preparing beverages.
Figure 3:
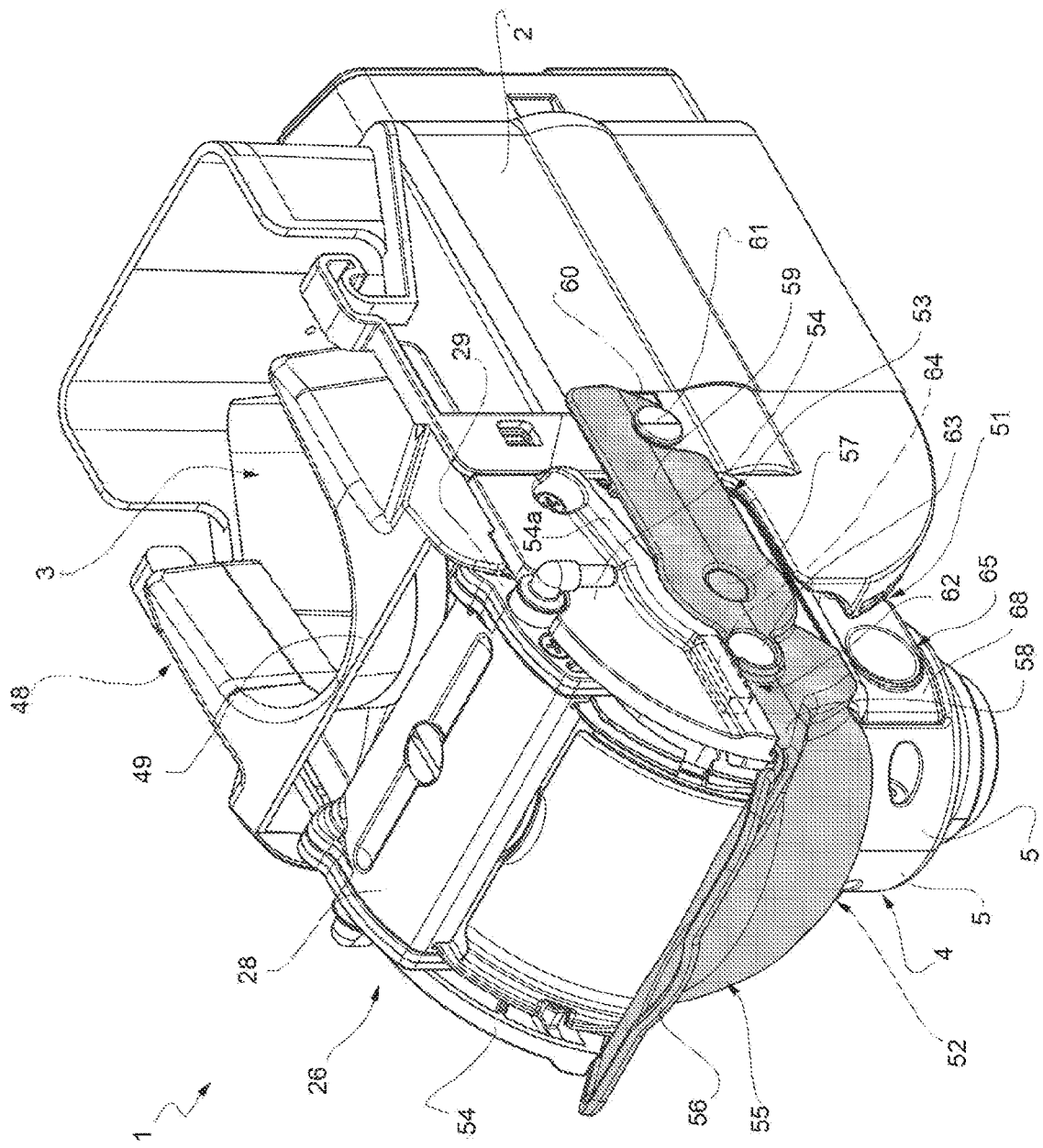
FIG. 3 shows the brewing apparatus of FIG. 2 arranged in a closed configuration.
Figure 4:
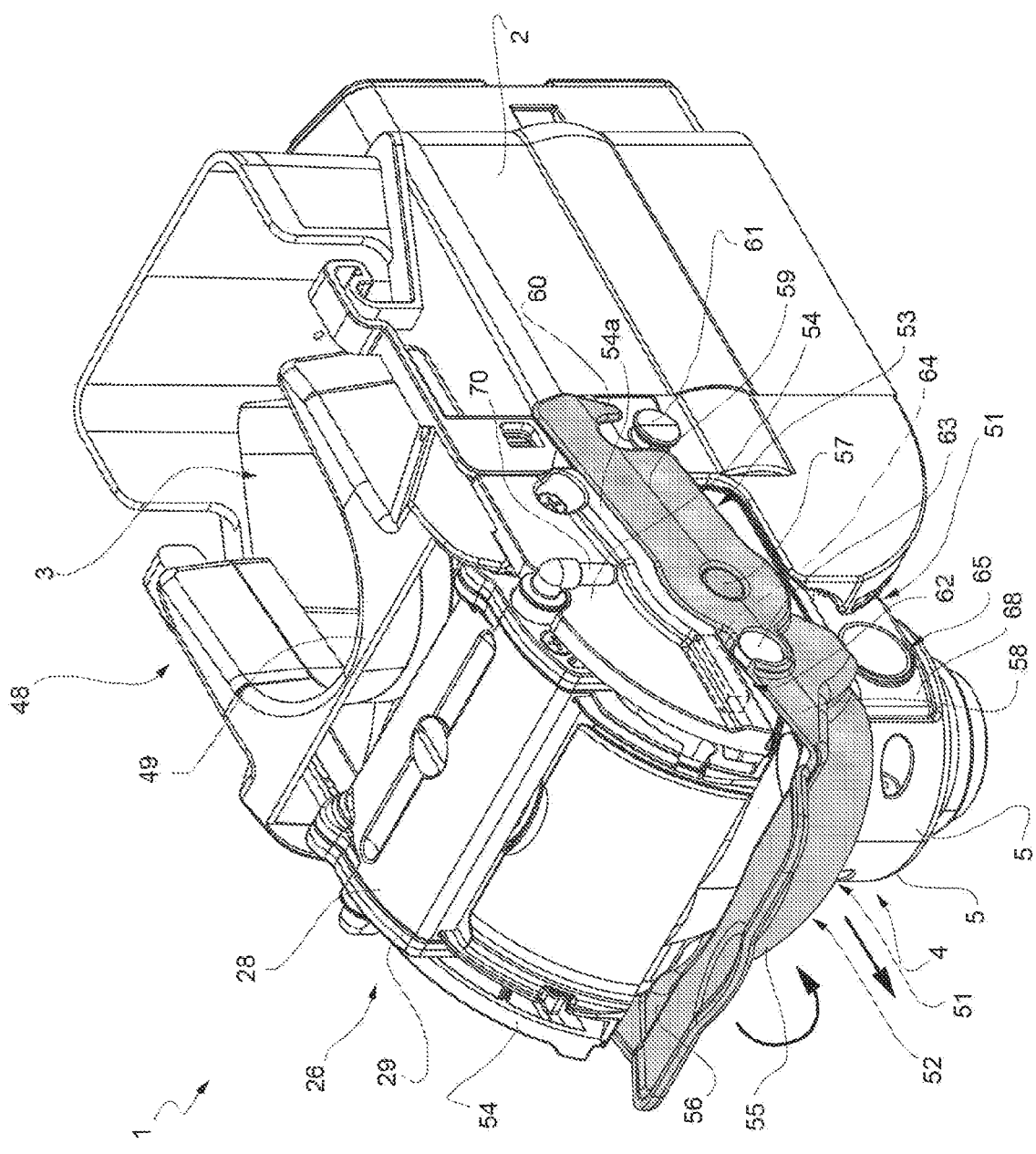
FIG. 4 shows the brewing apparatus of FIG. 3 arranged in a release position from the support.
Figure 5:
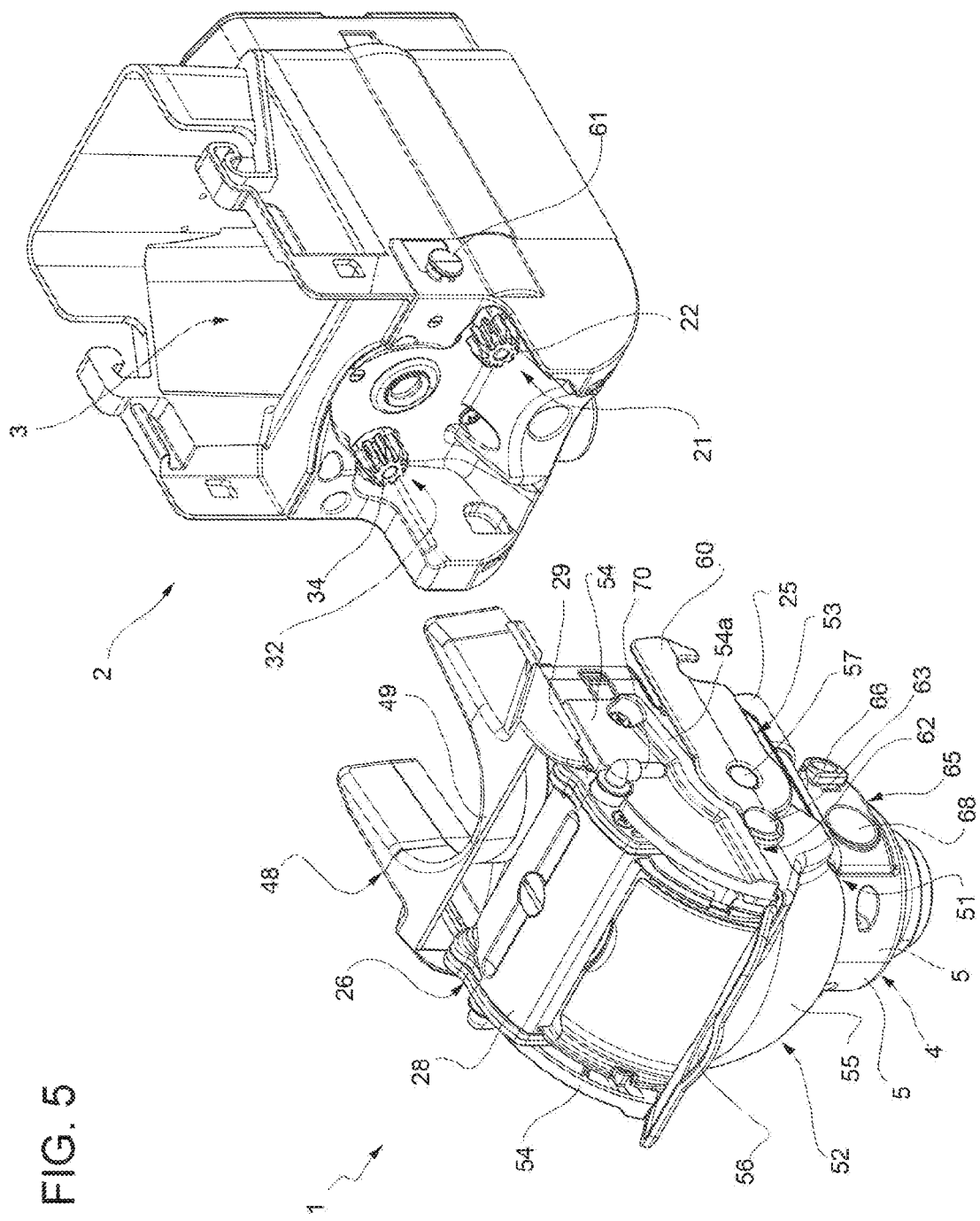
FIG. 5 shows the brewing apparatus of FIG. 3 detached from the support.

As shown in FIGS. 2, 3 and 5, the brewing device 1 is configured to be releasably fastened, as illustrated below, on a support body 2, which comprises power take-offs to operate, as mentioned below, movable components of the brewing device 1, and a discharge channel 3 through which exhausted material may be discharged from the brewing device 1 at the end of each beverage preparation cycle.

As shown in FIG. 1, the brewing device 1 comprises a frame 4 formed by two shells 5 firmly mutually connected, and each comprising a lateral wall 6, which is opposite to the lateral wall 6 of the other shell 5 and comprises an external flat face 7 parallel to a face 7 of the other lateral wall 6.

The two shells 5 define a space therebetween, in which a cylindrical tubular body 8 is mounted, which has a longitudinal axis 9 and internally defines a brewing chamber 10 which communicates externally through an upper opening 11 through which a material to be brewed may be loaded and discharged, and is closed at a bottom by a piston 12 operable to compress/eject the material.

Figure 6:
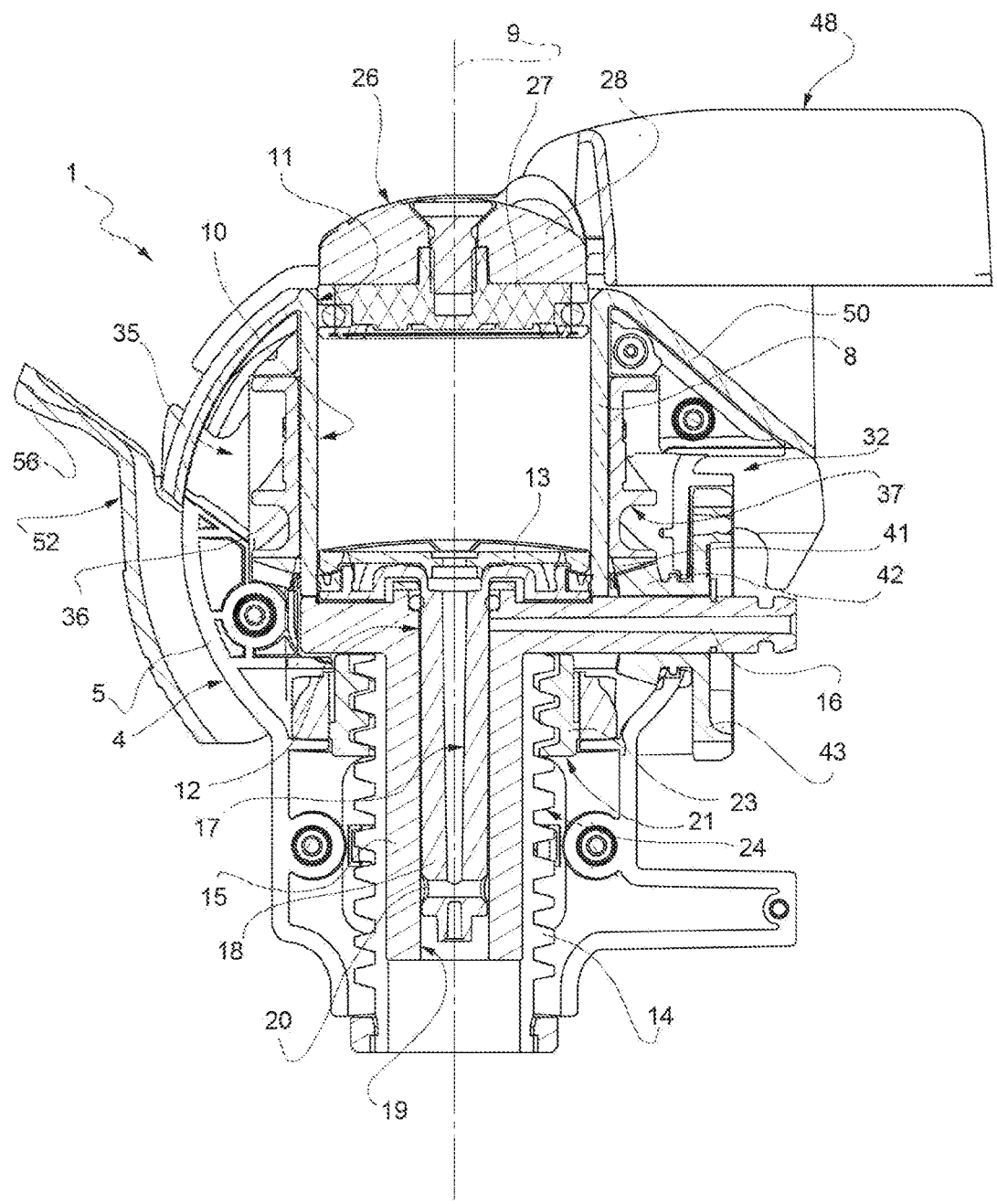
FIG. 6 is a cross-sectional view of the brewing device of FIG. 3 on a central plane of symmetry.

As shown in FIGS. 1 and 6, the piston 12 comprises a head 13 and a tubular rod 14, which is slidably mounted on a cylindrical body 15 integral with the frame 4, and is provided with two diametrically opposite transverse appendages which slidingly engage respective longitudinal slots of the rod 14. One of the two transverse appendages is solid, while the other appendage is tubular and defines an inlet conduit 16 for the brewing water that, during operation, is supplied to the brewing chamber 10 by the piston 12.

To this purpose, the head 13 of the piston 12 is in the form of a shower plate and receives brewing water from a water supply channel 17, which is arranged in an elongated element 18 integral with the head 13 and slidably mounted in an axial hole 19 of the cylindrical body 15, and has one or more transverse holes 20 fluidly communicating with an annular gap between the elongated element 18 and the hole 19.

The piston 12 is operated by an actuating device 21 comprising a reversible electric motor 21a (FIG. 12), which is mounted on the support body 2 and comprises a power take-off 22 (FIG. 5), and a gear transmission comprising a toothed wheel 23 coaxial to the axis 9 and provided with an internal toothing which meshes with an external thread 24 of the rod 14, and an external toothing which meshes with an endless screw of a spindle 25 housed in a recess of the frame 4 and releasably coupled with the power take-off 22.

As shown in FIGS. 1-3 and 6, the brewing device 1 further comprises a closing body 26, which is movable, relative to the frame 4 and to the brewing chamber 10, away from and towards a sealed closing position, in which the closing body sealingly closes the upper opening 11, hereinafter referred also to as dispensing position because the dispensing and the brewing of the beverage occur in said position.

In particular, the closing body 26 comprises a piston 27 and a portal supporting structure comprising a traverse 28 directly connected to the piston 27, and two guide plates 29, which extend downwardly from ends of traverse 28 and are arranged mutually facing and specularly shaped; consequently, below and where possible, only one of the two guide plates 29 will be described.

Each guide plate 29 is arranged facing face 7 of a respective lateral wall 6 and has a slot 30 slidingly engaged by a respective fulcrum pin 31 carried by, and projecting from, the lateral wall 6.

The closing body 26 is operated by an actuating device 32 and its movements are guided by a control device 33 which, like the actuating device 32, is part of the brewing device 1.

In particular, the actuating device 32 and the control device 33 are configured to translate and rotate the closing body 26 about the fulcrum pins 31 to cause it to be arranged in the closing position (FIG. 3), in which the piston 24 sealingly engages the opening 11, in an opening position (FIG. 2), in which the piston 27 leaves the opening 11 completely uncovered and is angularly offset relative to the closing position, and in an intermediate or exhausted material ejection position (not shown), in which the closing body 26 is raised relative to the closing position and the piston 27 is external and axially aligned with the opening 11.

To this purpose, the actuating device 32 comprises an electric motor 32a (FIG. 12), that is mounted on the support body 2 and comprises a power take-off 34 (FIG. 5), and a cam drive 35 arranged between the motor and the closing body 26.

The cam drive 35 comprises a barrel cam 36 arranged around the brewing chamber 10 between the cylindrical tubular body 8 and the lateral walls 6 of the frame 4, coaxial to the axis 9. The barrel cam 36 comprises a track 37 on its lateral wall, and two cam followers 38, which engage the track 37 in diametrically opposite positions and extend specularly, in a direction transversal to axis 9, outwards from the barrel cam 36, through and beyond the respective lateral walls 6.

Figure 7:
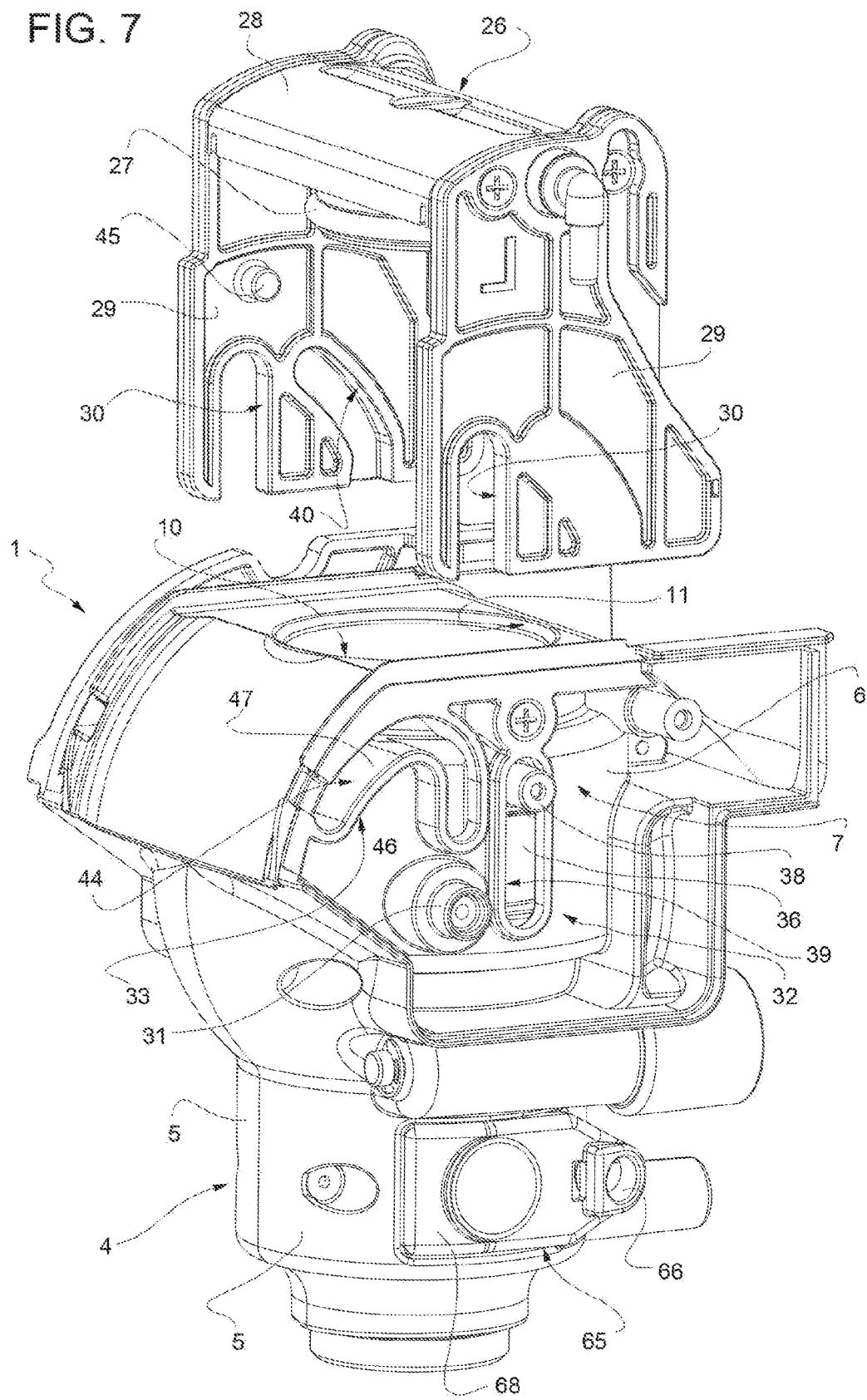
FIG. 7 shows a perspective and partly exploded view of a detail of the brewing apparatus of FIG. 3.

In particular, as shown in FIG. 7, the lateral walls 6 comprise respective specular slots 39, each of which extends in a direction parallel to the axis 9 and is slidably engaged by a respective cam follower 38 to transform, during operation, a rotation of the barrel cam 36 about the axis 9 into a linear motion of the cam followers 38 along the axis 9.

The two cam followers 38 can be physically separated, as in the embodiment shown in FIG. 1, or, according to a variant not shown, they can be firmly connected to each other, they can for example be mounted on a supporting ring arranged coaxially and externally to the barrel cam 36. The advantage of this solution is to eliminate, or at least to limit, any clearance between the cam followers 38 and the track 37, with resulting benefits for the accuracy of the transmission of motion.

The cam drive 35 further comprises two tracks 40, each of which is formed, specular to the other track 40, on one side of a respective guide plate 29 towards the brewing chamber 10 and facing the corresponding lateral wall 6. Each track 40 extends in front of slot 39 of the lateral wall 6 facing the respective guide plate 29, and is slidably engaged by an end portion of the cam follower 38 extending through and beyond the slot 39.

Therefore, the coupling between the cam followers 38 and the tracks 40 enables motion to be transmitted from the barrel cam 36 to the closing body 26 by transforming the linear motion of the cam followers 38 along the slots 39 in a rotation and translation of the closing body 26 relative to the fulcrum pins 31, according to a motion law defined by the profile of the tracks 40 and by the mentioned control device 33.

The barrel cam 36 controls the movement of the cam followers 38 along the slots 39 with a law depending on the profile of the track 37 of the barrel cam 36 and on its rotation speed.

In a preferred embodiment, the track 37 has a sinusoidal profile, with upper peaks defining the opening position of the closing body 26, and lower peaks defining the closing position.

As shown in the Figures, the profile of the track 37 is preferably designed to cause, during a complete rotation of the barrel cam 36 about the axis 9, clockwise or anticlockwise, the closing body 26 to move from the opening position to the closing position and, vice versa, from the closing position to the opening position.

As shown in FIGS. 1 and 6, the barrel cam 36 is operated by the actuating device 32 via a gear reducer mechanism comprising a toothed crown 41 integral with the barrel cam 36 and meshing with a pinion 42, which is supported by the frame 4 and is angularly integral with a toothed wheel 43 designed to rapidly and releasably couple with the power take-off 34.

As shown in FIG. 7, the control device 33 that controls the movement of the closing body 26 moved by the cam drive 35 comprises two fixed tracks 44, each of which is arranged on the face 7 of a respective lateral wall 6, and is engaged by a cam follower 45 carried by the guide plate 29 facing the lateral wall 6.

In order to guide the movement of the closing body 26 between the closing, intermediate, and opening positions, each track 44 comprises a rectilinear portion 46 parallel to the axis 9 and a circle arc-shaped portion 47 coaxial to the fulcrum pin 31.

As shown in FIGS. 2 and 3, the brewing device 1 further comprises a scraper member 48 movable with the closing body 26 to discharge the exhausted material ejected from the brewing chamber 10 by the piston 12 at the end of the preparation of the beverage.

The scraper device 48 is U-shaped, it is hinged to the guide plates 29, and comprises two lateral arms, each of is connected to an end of a doctor blade 49 operable to move onto opening 11 when the closing body 26 moves from the opening position to the intermediate position to push the exhausted material above a slide 50 connected with the top of the tubular body 8 and thus causing it to fall into the discharge channel 3.

Finally, the brewing device 1 comprises a fastening device 51 to releasably connect the brewing device 1 to the support body 2.

As shown in FIGS. 1, 3, 4 and 5, the fastening device 51 comprises a release lever 52, which is hinged to the frame 4 to rotate about an axis transversal to axis 9, between a normal connection position (FIG. 3), in which the brewing device 1 is firmly fastened to the support body 2, and a release position (FIG. 4), in which the brewing device 1 may be rapidly mounted to, and removed from, the support body 2.

The release lever 52 is U-shaped and comprises two rocker arms 53, which are mutually specular and hinged to respective outer walls 54 of the frame 4, facing the respective guide plates 29, and a transversal member 55, which is arranged opposite the brewing device 1 with respect to the support body 2, connects ends of the rocker arms 53, and is shaped in such a way as to define an operation handle 56 of the release lever 52.

As shown in FIG. 2, each rocker arm 53 is hinged on the respective outer wall 54 to rotate about a respective rotating pin 57, which is coaxial to the other pin 57 and transversal to axis 9, and identifies two arms on the rocker arm 53, a first arm 58 extending from the pin 57 to the transversal member 55, and a second arm 59 extending from the pin 57 to the support body 2.

Each arm 59 has a hook-shaped end portion 60 intended to transversally engage a respective hooking pin 61 carried by the support body 2.

The rocker arms 53 preferably lie on respective planes parallel to each other and to axis 9. Furthermore, each outer wall 54 comprises a stop 54a defining a mechanical end-stroke for the respective rocker arm 53 when the latter is moved from the connection position to the release position. In the example shown, the stop 54a is made from a ridge projecting from the outer wall 54 and bounded, towards the rocker arm 53, by a sloped surface defining a shoulder against which the rocker arm 53 abuts when the release lever 52 reaches the release position.

In addition to the release lever 52, the fastening device 51 comprises a locking mechanism 62 designed to prevent an accidental removal of the release lever 52 from the connection position when the brewing device 1 is mounted onto the support body 2 (FIG. 3), so as to ensure the stability of the connection and, at the same time, cause disconnection and, in particular, repositioning of the brewing device 1 through the actuation of the release lever 52 to be simple and rapid.

The locking mechanism 62 is magnetic and comprises, for each rocker arm 53, a magnet 63 connected to the rocker arm 53, and a magnet 64 connected to the associated outer wall 54. The magnets 63 and 64 are mutually positioned in such a way that, when the release lever 52 is in the connection position (FIG. 3), they are mutually in contact, and, when the release lever is in the release position (FIG. 4), they are spaced apart and the attraction force results in a torque tending to rotate the respective rocker arm 53 about the pin 57 to take the release lever 52 back into the connection position.

In the shown example (FIG. 2), the movement of the release lever 52 from the connection position to the release position occurs as a result of a downward operation, by the user, of the handle 56. In a variant not shown, the release lever 52 may be mounted, mutatis mutandis, to be reversely releasable, namely by operating upwardly the handle 56. Likewise, the magnets 63 and 64 may also be arranged at arm 58, as in the shown example, or alternatively at arm 59, as long as their position is such as to achieve the above effect, i.e., to take back, and keep, the release lever 52 in the connection position.

During operation, in order to detach the brewing device 1 it is necessary to operate the handle 56 in such a way as to exceed the attraction force of the magnets 63 and 64, and cause the rocker arms 53 to rotate up to result in the respective hook portions 60 disengaging from the hooking pins 61 and the release lever 52 being taken into the release position. At this point, it is sufficient to move the brewing device 1 away from the support body 2, so as to disengage the power take-offs 22 and 34 from the spindle 25 and, respectively, the toothed wheel 43.

Similarly, to connect the brewing device 1 to the support body 2 it is sufficient to align the power take-offs 22 and 34 with the respective coupling gears, and move the brewing device 1 towards the support body 2, while maintaining, by means of the handle 56, the release lever 52 in the release position. Once the final position has been reached and the release lever 52 has been released, the latter automatically moves to the connection position as a result of the attraction between the magnets 63 and 64.

As shown in FIGS. 5, 7, 10 and 11, the fastening device 51 preferably further comprises, in addition to the release lever 52 and the locking mechanism 62, a safety device 65 to prevent the detachment of the brewing device 1 from the support body 2 as a result of an accidental actuation of the handle 56.

The safety device 65 comprises two elastic detents 66 mounted elastically on the frame 4 to snap-fit engage respective recesses 67 formed in the support body 2. The elastic detents 66 are manually operable through respective control levers 68, which are specularly mounted on the outside of respective shells 5, on opposite sides of the rod 14, through the interposition of respective springs 69 to maintain the control levers 68 in a normal widened position (position represented in the lower half of FIG. 10), in which the elastic detents 66 engage the respective recesses 67.

The safety device 65 is manually deactivable by applying a pressure on the control levers 68 to bring them to a close-up position (position illustrated in the upper half of FIG. 10), in which the respective elastic detents 66 are out of the recesses 67 and the brewing device 1 may be removed from the support body 2 after having previously moved the release lever 52 into the release position.

Operation of the brewing device 1 during a preparation cycle of a beverage will be described below with reference to FIGS. 2, 3, 8 and 9.

Figure 8:
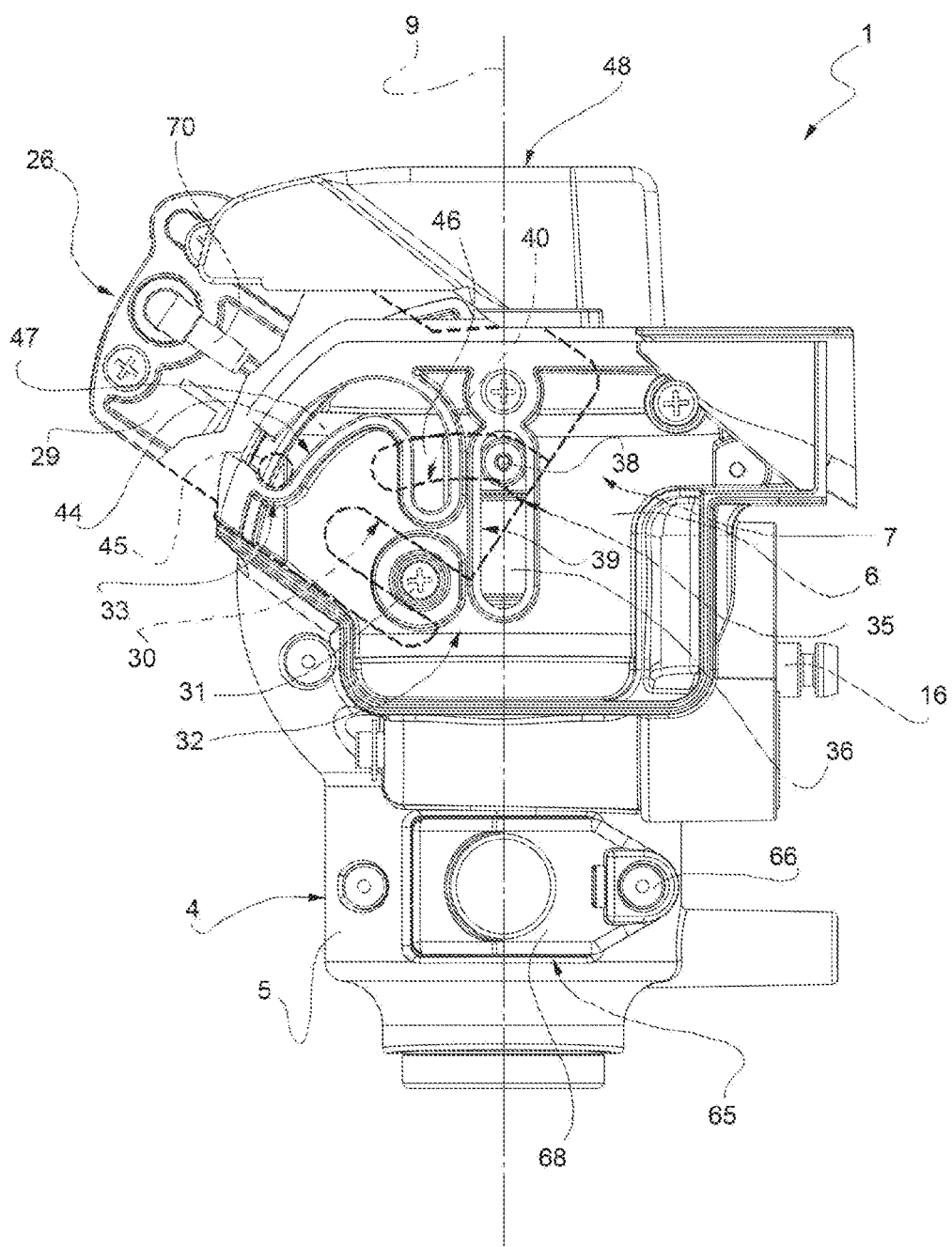
FIGS. 8 and 9 show side views of the detail of FIG. 7 in the open and closed configurations shown in FIGS. 2 and 3 respectively.

FIGS. 2 and 8 show the brewing device 1 at the beginning of a preparation cycle. In this position, the piston 12 is arranged at the bottom of the brewing chamber 10, the closing body 26 is in the opening position, the cam followers 38 of the barrel cam 36 are arranged at the upper ends of the slots 39 and at the lower ends of the tracks 40, and the cam followers 45 carried by the guide plates 29 are arranged, along the tracks 44, at the end of the circle arc-shaped portion 47 furthest from the rectilinear portion 46.

Once the material to be brewed has been loaded, the motor of the actuating device 32 is operated to bring the closing body 26 into its closing position. During this movement, the cam followers 38 moves down along the slots 39 under the trust of the barrel cam 36 and, as a result of the coupling with the tracks 40, they impart a downward trust to the guide plates 29 that causes, thanks to the coupling between the cam followers 45 and the tracks 44, the closing body 26 to rotate about the fulcrum pins 31 from the opening position to the intermediate position, and a subsequent downward translation from the intermediate position to the closing position.

Figure 9:
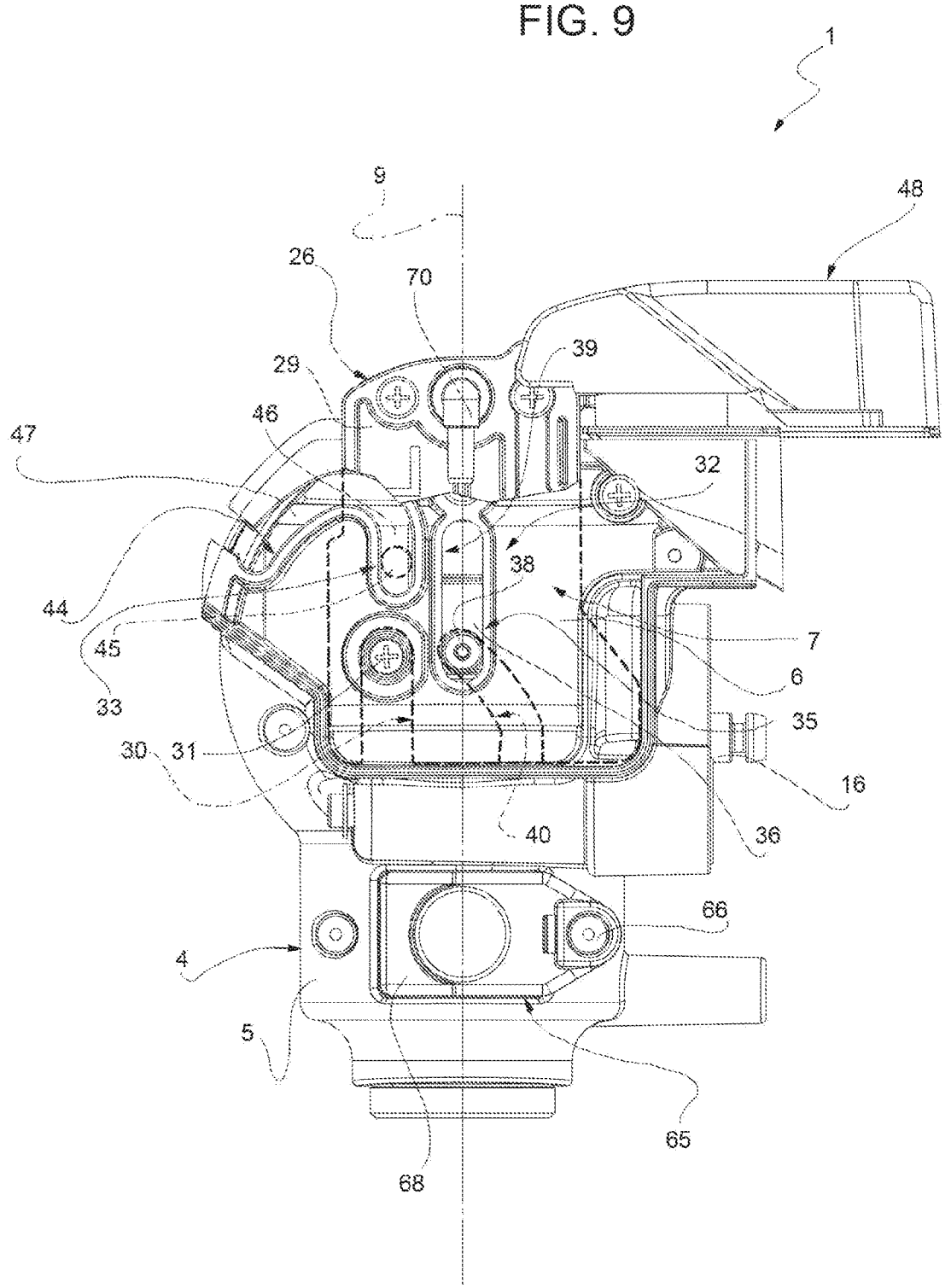
Figure 10:
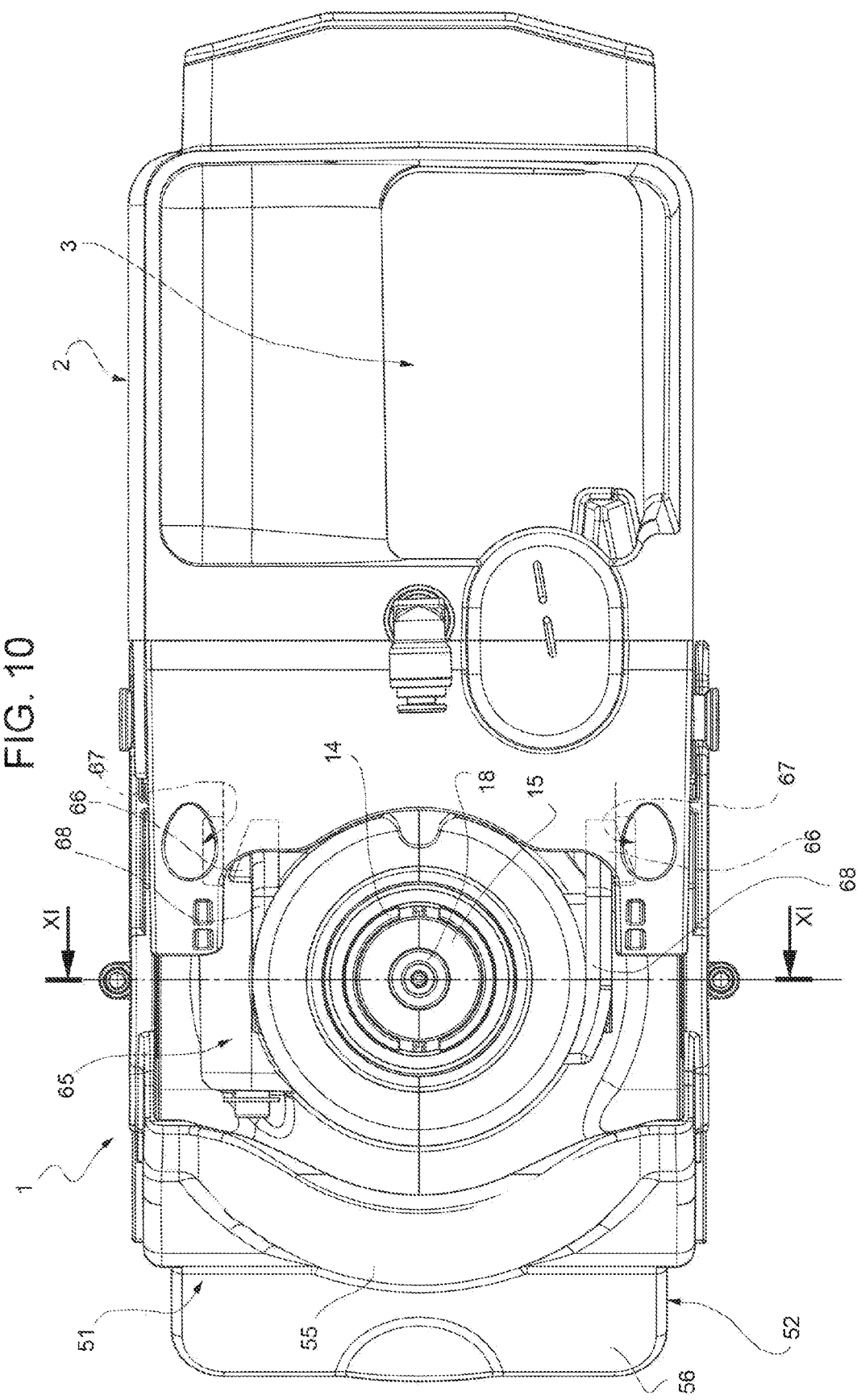
FIG. 10 is a top view of the brewing apparatus.
Figure 11:
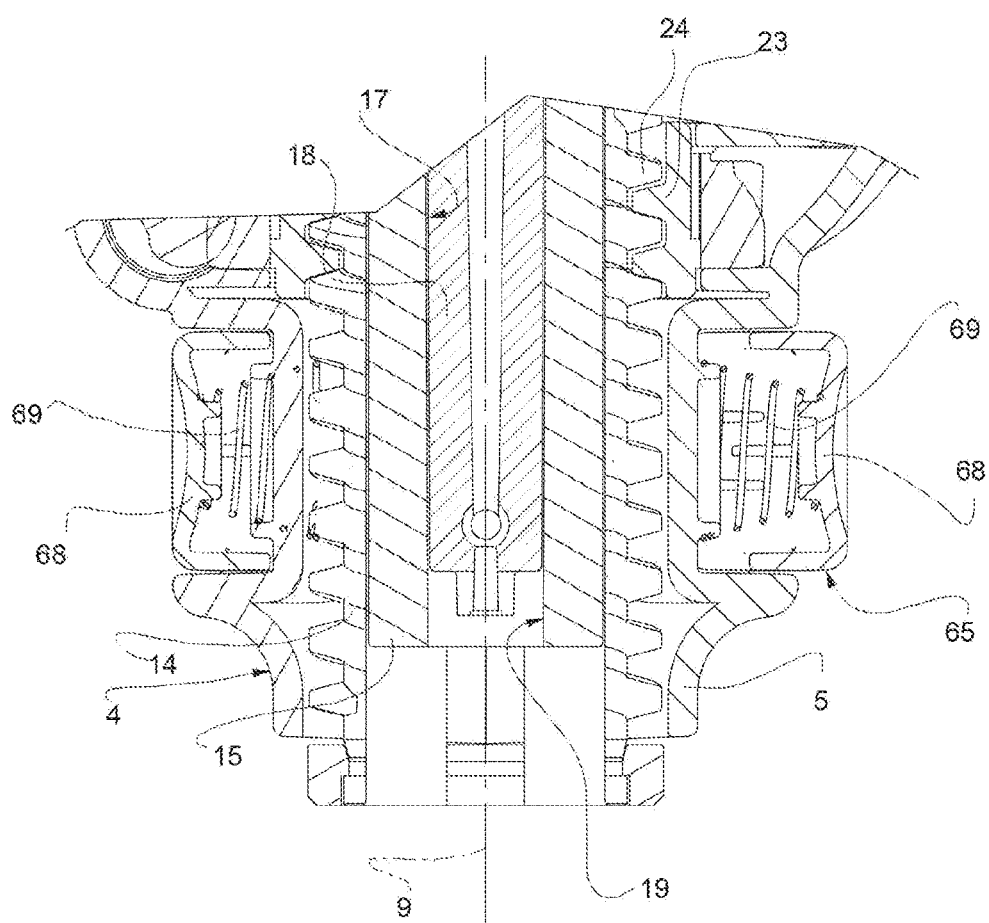
FIG. 11 is a cross-sectional view of a detail of the brewing apparatus of FIG. 10 along line XI-XI.

As shown in FIG. 9, in the closing position of the closing body 26, the cam followers 38 of the barrel cam 36 are arranged at the lower ends of the slots 39 and at the upper ends of the tracks 40, and the cam followers 45 carried by the guide plates 29 are arranged, along the tracks 44, at the ends of the rectilinear portion 46 furthest from the circle arc-shaped portion 47.

Once the closing body 26 has reached the closing position and the actuating device 32 has been deactivated, the actuating device 21 is activated to lift the piston 12 and compress the material to be brewed. Pressurised hot water is subsequently supplied to the brewing chamber 10 through the conduit 16, the channel 17 and the head 13 of the piston 12 to brew the material with resulting production of the beverage, that exits through the piston 27 and a dispensing conduit 70 carried by the closing body 26 (FIG. 3).

Once the dispensing is over, the barrel cam 36 is actuated again to rotate about axis 9 and move the closing body 26 to the opening position and, subsequently, to the closing position, so as to push into the discharge channel 3, through the scraper member 48, the exhausted material ejected from the brewing chamber 10 as a result of the lifting of the piston 12.

Regarding the above-mentioned, it should be specified that the actuation of the closing body 26 through the barrel cam 36 enables the closing body 26 to be moved from the opening position to the closing position, and vice versa, as by rotating the barrel cam 36 always in the same direction of rotation. This entails a significant reduction of the complexity of the motor control software, with the resulting benefits both for the control and for the reliability of the brewing device 1.

The possibility of carrying out a complete cycle by causing the barrel cam 36 to rotate always in the same direction of rotation does not, however, exclude the possibility of controlling the barrel cam 36 so as to reverse its direction of rotation as required. For example, the rotation of the barrel cam 36 can be usefully reversed when the closing body 26 reaches the intermediate position to discharge the exhausted material so as to carry the closing body 26 back to the opening position without necessarily passing through the closing position.

From a more strictly structural point of view, the use of the barrel cam 36 enables a significant increase to be obtained in the compactness of the brewing device 1 compared to similar known devices, in particular compared to the one discussed in the introductory part of the present description. Indeed, the barrel cam 36 enables all the components of the cam drive 35 that moves the guide plates 29 of the closing body 26, and all the components of the control device 33 that controls the movement of the guide plates 29, to be placed in the gap between the brewing chamber 10 and the guide plates 29, with the resulting reduction in the overall dimensions of the brewing device 1.

Figure 12:
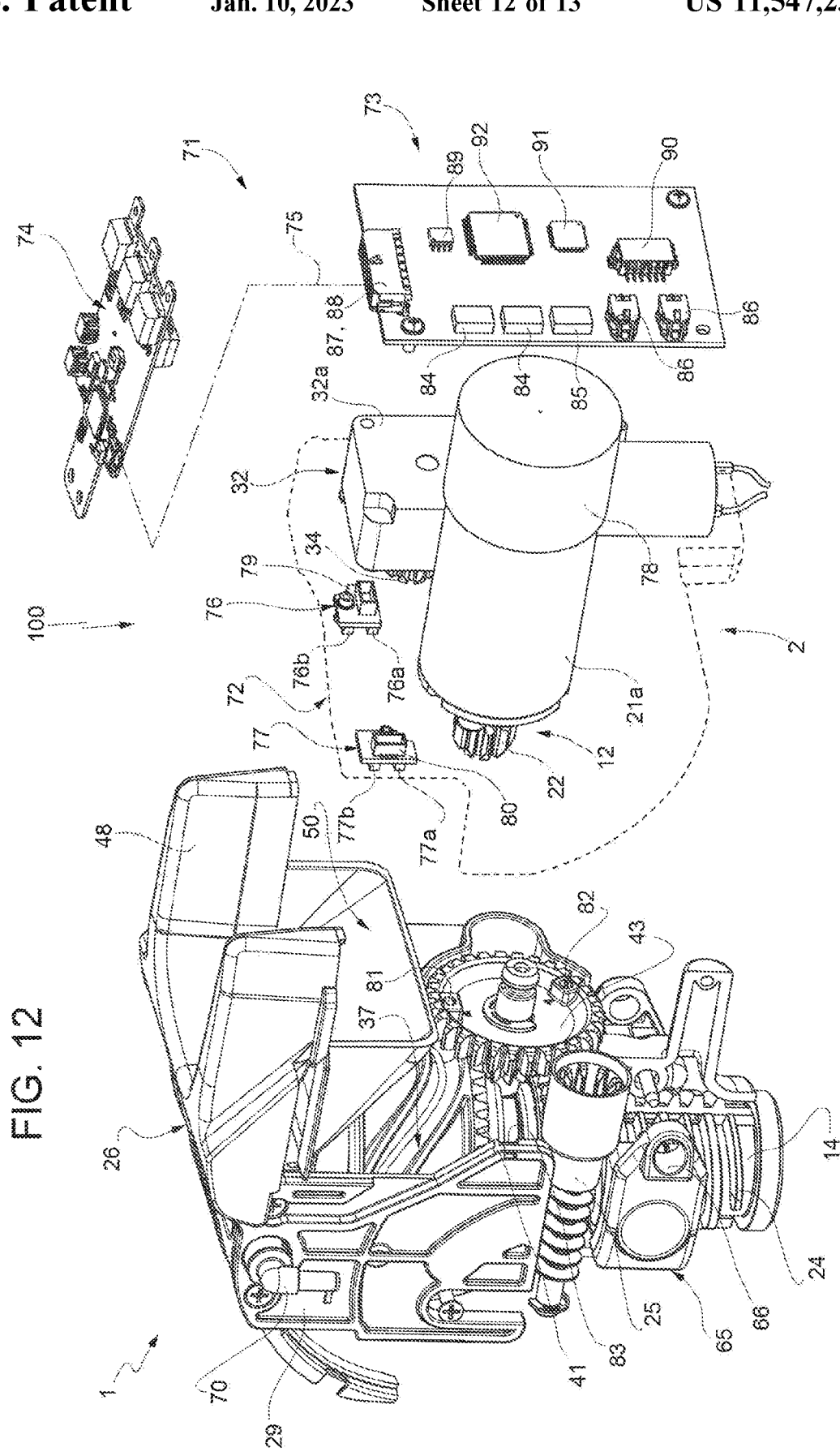
FIG. 12 shows a layout of components of an electronic control system of the brewing device.

Finally, the brewing device 1 is provided with an on-board electronic control system 71, shown in FIG. 12, configured to be associated or coupled with, preferably arranged in, the brewing device 1.

As shown in FIG. 12, the on-board electronic control system 71 comprises:

- a sensory system 72 configured to output electrical signals such as to allow reaching, by the closing body 26, of the opening, closing and ejection positions to be sensed, and the axial position of the piston 12 to be determined, and
- an on-board electronic control printed circuit board 73 configured to be connectable to the sensory system 72.

The on-board electronic control printed circuit board 73 is further configured to be connectable to an electronic control board 74 of the beverage preparation machine 100 and external to the brewing device 1 to receive therefrom commands relating to the operation of the brewing device 1 and responsively to control operation of the brewing device 1, and in particular of the electric motors 21a and 32a thereof, based on the electrical signals outputted by the sensory system 72 and on commands received from the external electronic control board 74, as described in detail here below, to perform beverage preparation cycles.

The on-board electronic control board 73 may be conveniently connected to the external electronic control board 74 through a fieldbus-based communication network 75, preferably a Controller Area Network (CAN) bus or equivalent, and cooperates therewith through a master-slave communication architecture, in which the on-board electronic control board 73 is the slave electronic control board, and the external electronic control board 74 is the master electronic control board.

The sensory system 72 comprises:

- two electronic sensor printed circuit boards 76, 77 separate from the on-board control electronic board 73 and arranged in the brewing device 1 to enable the on-board control electronic board 73 to sense the reaching, by the closing body 26, of the opening, closing and ejection positions; and
- an encoder 78 coupled to the electric motor 21a to enable the on-board control electronic board 73 to determine the axial position of the piston 12 in the brewing chamber 10.

The two electronic sensor boards 76, 77 are of the type normally available on the market and are fastened with screws to a wall of the support body 2 facing the brewing device 1.

Each electronic sensor board 76, 77 comprises a couple of Hall effect sensors 76a, 76b and 77a, 77b connected, through suitable electrically conductive tracks, to a respective electrical connector 79, 80 to enable the electronic sensor board 76, 77 to be connected to the on-board control electronic board 73 via a dedicated electric cable (not shown).

The electronic sensor board 76 is mounted to enable passage and, hence, proximity to be sensed of two magnetic elements 81, 82 mounted on the toothed wheel 43 in angular positions corresponding, one to the opening and closing positions and the other to the ejection position of the closing body 26. Conversely, the other Hall effect sensor is not used and it could therefore even be omitted.

In this regard, it is to be appreciated that, as previously mentioned, the profile of the track 37 is such that a complete rotation of the barrel cam 36 is equivalent to a complete movement cycle of the closing body 26, whereby the angular positions of the toothed wheel 43 in the opening and closing positions of the closing body 26 coincide. For this reason, the electronic sensor board 76 may not alone distinguish the opening position from the closing position, but only distinguish these position from the ejection position.

For this reason, the electronic sensor board 77 is mounted to enable proximity to be sensed of a further magnetic element 83 carried by the guide plate 29 in such a position as to be in the proximity of the Hall effect sensor 77a when the closing body 26 is in the closing position, and in the proximity of the Hall effect sensor 77b when the closing body 26 is in the ejection position.

As is known, a Hall effect sensor is formed by an element that is sensitive to variations in the magnetic field flux when a ferromagnetic material body gets close and moves away from the sensitive element, and outputs a digital electrical signal that has a first logic level, typically high, when the ferromagnetic material body is arranged in the proximity of the Hall effect sensor, and otherwise a second logic level, low in the example considered.

Thus, the output digital electrical signal of the Hall effect sensor 76a of the electronic sensor board 76 enables the on-board control electronic board 73 to sense the reaching of the ejection position and of one out of the opening and closing positions, in which the output digital electrical signal has a high logic level, while the output digital electrical signals of the two Hall effect sensors 77a and 77b of the electronic sensor board 77 enable the on-board control electronic board 73 to sense, on the one hand, the reaching of the closing and dispensing positions, in which both the output digital electrical signals have high logic levels, and, on the other hand, to confirm the reaching of the opening position, in which both of the output digital electrical signals do not sense the proximity of the magnetic element 83 and, hence, have both low logic levels.

The Hall effect sensors are conveniently calibratable, i.e., they enable the degree of proximity of the respective magnetic element, which causes the commutation of the respective digital electric signal between the high and low logic levels, to be accurately adjusted by simply acting on a threshold value with which the analogue electrical signals outputted by the elements that are sensitive to the variations of the magnetic field flux are compared to output the digital electrical signals.

Figure 13:
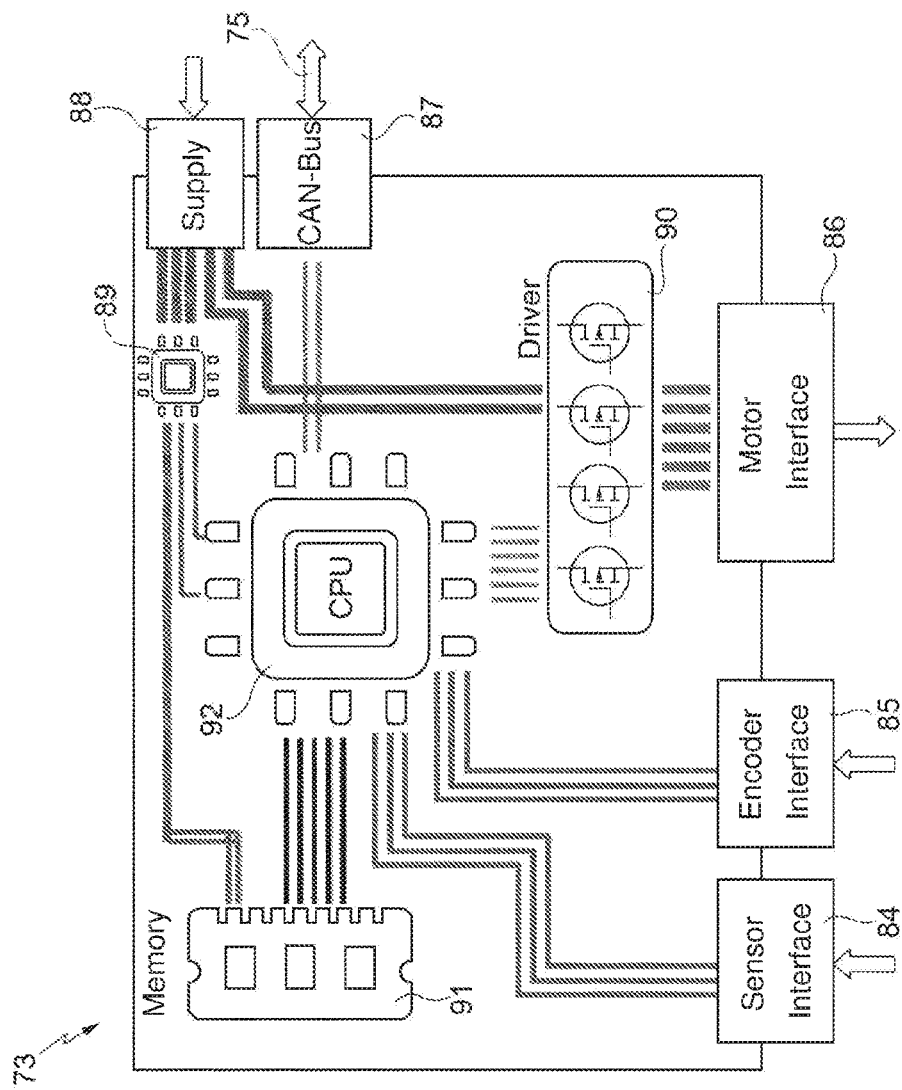
FIG. 13 shows a block diagram of an electronic control printed circuit board of the electronic control system of the brewing device.

As schematically shown in FIG. 13, the on-board electronic control board 73 comprises:

- an input interface (connector) 84 for the connection to the electronic sensor boards 76, 77,
- an input interface (connector) 85 for the connection to the encoder 78,
- an output interface (connector) 86 for the connection to the electric motors 21a, 32a,
- an input/output communication interface (connector) 87 for the connection to the external electronic control board 74,
- an electric power supply interface (connector) 88 for the connection to an external electric power supply for electrically power supplying the on-board electronic control board 73, the sensor boards 76, 77, and the electric motors 21a, 32a, and in particular to an external electric power supply capable of supplying for example +5V for electrically power supplying the on-board electronic control board 73 and the sensor boards 76, 77, and +12V for electrically power supplying the electric motors 21a, 32a,
- a voltage stabiliser 89 connected to the electric power supply interface 88 to stabilise the voltages supplied by the external electric power supply, a driver stage 90 configured to output, in response to received electrical control signals, electrical drive signals, conveniently of the Pulse Width Modulation (PWM) type, for the electric motors 21a and 32a, and to measure and output data indicative of the electric power absorbed thereby;

a memory 91 to store data associated with the operation of the on-board electronic control board 73 (brewing device ID, diagnostics results, alarm history, etc.), and a microcontroller 92 connected to the other components of the slave electronic control board through suitable electrically conductive tracks, and programmed to:

receive the electrical signals outputted by the Hall effect sensors 76a, 77a, 77b, and by the encoder 78, receive from the driver stage 90 data indicative of the electric current absorbed by the electric motors 21a and 32a;

receive from the external electronic control board 74, through the input/output communication interface 87, commands for operating the electric motors 21a, 32a;

interpret and execute the received commands to output, also based on the electrical signals received from the Hall effect sensors 76a, 77a, 77b and from the encoder 78, electrical control signals for the driver stage 90 to cause the driver stage 90 responsively outputs electrical drive signals for the electric motors 21a, 32a, so as to operate the latter to complete an above-described dispensing cycle;

determine the electric current consumptions of the electric motors 21a and 32a, identify possible locking of the closing body 26 and of the piston 12 based on the electric current consumptions of the electric motors 21a and 32a and of the electrical signals outputted by the Hall effect sensors 76a, 77a, 77b, discriminate the various operational phases and the stress of the brewing device 1 knowing a priori the nominal electric current consumption (for example, during ejection of the exhausted material the movement of the closing body 26 is fluid and the electric current consumption is medium/low and stable during the movement, while during compression of the material to be brewed the electric current consumption is high and with a peak during compression), and automatically calibrate, in response to a received command, the Hall effect sensors based on a reading of the analogue electrical signals outputted by the Hall effect sensors.

The provision on-board of the brewing device 1 of an electrical/electronic support capable of managing all the above-mentioned functions through a localised intelligence dedicated to the integration of all the functions enables the use and the response speed of the brewing device 1 to be significantly improved, thereby optimising use thereof.

Thanks to the fact that the on-board electronic control board 73 is capable of communicating with the outside through a dedicated can BUS interface (or another protocol), this enables diagnostics, control, and data storage function to be performed, such as to allow:

a "black box" control of the brewing device 1 to be implemented, recalling known commands, through the communication protocol, to move the closing body 26 and the piston 12. The commands that may be imparted for a transverse and comprehensive management for the various applications that may request that may be both simpler commands, e.g., lifting the piston 12 to a given height, and more complex commands, e.g., closing and automatically pressurising the brewing chamber 10, completely ejecting the exhausted material, restoring the initial position, etc.;

leave management and diagnostics completely integrated in the brewing device 1, enabling more accurate and dedicated results to be obtained both in terms of performance and in terms of software maintenance. All information required for the telemetric data transmission, such as electrical current and encoder position readings, etc., will then be transported through a CAN bus-based communication;

speed up testing and maintenance thanks to the operational autonomy that the on-board intelligence allows to achieve, together with malfunction detection and provisioning of test benches;

store diagnostics and counting data relating to the movement of the brewing device 1, such as to enable this information that is relevant for warrant and use purposes to be safely saved;

store production information such as batches, production dates, and serial numbers;

make the brewing device 1 interchangeable with others without necessarily carrying out substantial electrical adaptations, making it possible in future to use various types of brewing devices integrating them with newly developed machines without having to arrange for electrical adaptations and/or additional integration boards; and render the brewing device independent of the general management of the beverage preparation machine, so that the brewing device may be interfaced with any beverage preparation machine, as long as it is equipped with a CAN bus-based network interface.

Moreover, the simple interfacing (network connection and electrical supply) of the on-board electronic control board 73 with external systems results in the invention being implementable also in brewing devices of types (even very) different from the one described above, and in particular brewing devices in which beverages are prepared via the cooperation of the brewing chambers with members of the brewing device that are different from the described ones and/or according to modes different from the described ones.

The invention claimed is:

1. A combination of an electronic machine control unit and an electronic brewer control system for a beverage preparation machine; wherein the beverage preparation machine comprises a brewing device including: a brewing chamber configured to receive a material to be brewed; one or more members arranged to cooperate with the brewing chamber to prepare beverages; and one or more electric actuators operable to mutually move the members and the brewing chamber to prepare beverages; wherein the electronic machine control unit is external to the brewing device, and the electronic brewer control system is configured to be associable to the brewing device to allow operation of the brewing device to be electronically controlled; the electronic brewing control system comprises: a sensory system configured to output electrical signals to allow relative position of one or more of the members and of the brewing chamber to be determined during a beverage preparation cycle; and an on-board electronic brewer control unit separate from the electronic machine control unit and configured to be electrically connectable to the electronic machine control unit through a fieldbus-based communication network, the on-board electronic brewer control unit being connected to the sensory system to receive electrical output signals therefrom, and to the electric actuator(s) to supply electrical control signals thereto; wherein the electronic machine control unit is configured to output to the on-board electronic brewer control unit, through the fieldbus-based communication network, commands relating to the operation of the brewing device; wherein the on-board electronic brewer control unit is configured to: receive from the electronic machine control unit, through the fieldbus-based communication network, commands relating to the operation of the brewing device; and interpret and execute the received commands to responsively output, also based on electrical signals from the sensory system, electrical control signals for the electric actuator(s); wherein the electronic brewer and machine control units are configured to cooperate through a master-slave communication architecture, in which the on-board electronic brewer control unit is the slave electronic control unit, and the electronic machine control unit is the master electronic control unit.

2. The combination of claim 1, wherein the electronic brewer control system further comprises an electronic brewer control printed circuit board configured to be arrangeable in the brewing device, and comprising: the on-board electronic brewer control unit;

an input interface for connection to the sensory system, one or more output interfaces for connection to the electric actuator(s), an electric power supply interface for connection to an external electric power supply, and an input/output communication interface for connection to the fieldbus-based communication network, which interfaces are all connected to the electronic brewer control unit; and a driver stage configured to receive electrical control signals, to responsively output, based on the received electrical control signals, electrical drive signals for the electric actuator device(s), and to measure and output data indicative of an electric current absorbed by the electric actuator device.

3. The combination of claim 2, wherein the sensory system comprises one or more electronic sensor printed circuit boards configured to be arrangeable in the brewing device, separate from and connected to the electronic brewer control printed circuit board, and on each one of which one or more sensors are mounted.

4. The combination of claim 3, wherein the sensory system comprises one or more Hall effect sensors, each arranged in the brewing device to output a digital electrical signal switching between first and second logic levels depending on whether a magnetic element carried by a moving member of the brewing device is present in the proximity of the Hall effect sensor; and wherein each Hall effect sensor is calibratable to allow a degree of proximity of the magnetic element to the Hall effect sensor at which the digital electrical signal switches between the first and the second logic levels to be adjustable.

5. The combination of claim 1, wherein the fieldbus-based communication network is a Controller Area Network (CAN).

6. A beverage preparation machine comprising a brewing device including a brewing chamber configured to receive a material to be brewed, one or more members arranged to cooperate with the brewing chamber to prepare beverages, and one or more electric actuators operable to mutually move the members and the brewing chamber to prepare beverages; wherein the beverage preparation machine further comprises the combination of the electronic machine control unit and the electronic brewer control system of claim 1.

7. The brewing device of claim 1, wherein the electronic machine control unit comprises a circuit board that is free of a user interface thereon.

8. A brewing device for a beverage preparation machine, comprising:

a brewing chamber having a longitudinal axis and an opening through which a material to be brewed may be loaded and discharged; a closing body movable between a sealed closing position, in which the closing body sealingly closes the opening, and an open position, angularly spaced apart from the closing position, through an intermediate ejection position, in which the closing body is raised relative to the closing position along the longitudinal axis; a piston slidingly mounted in the brewing chamber axially opposite the closing body; a first electric actuator to move the closing body; a second electric actuator to move the piston; and an electronic brewer control system configured to allow operation of the brewing device to be electronically controlled; wherein the electronic brewing control system comprises: a sensory system configured to output electrical signals to allow relative position of one or more of the members and of the brewing chamber to be determined during a beverage preparation cycle;

and an on-board electronic control unit separate from an electronic machine control unit of the beverage preparation machine, which is external to the brewing device and is configured to control operation of the beverage preparation machine; wherein the on-board electronic control unit is configured to be electrically connectable to the electronic machine control unit through a fieldbus-based communication network, to the sensory system to receive electrical output signals therefrom, and to the electric actuator(s) to supply electrical control signals thereto;

wherein the on-board electronic control unit is further configured to: receive from the electronic machine control unit, through the fieldbus-based communication network, commands relating to the operation of the brewing device; and interpret and execute the received commands to responsively output, also based on electrical signals from the sensory system, electrical control signals for the electric actuator(s).

9. The brewing device of claim 8, wherein the sensory system comprises: a first Hall effect sensor arranged in the brewing device to output an electrical signal indicative of the passage, in the proximity of the first Hall effect sensor, of first and second magnetic elements mounted on a toothed wheel of a gear drive of the first electric actuator, in respective angular positions corresponding one to the opening and closing positions, and the other one to the ejection position of the closing body; wherein the second and third Hall effect sensors are arranged in the brewing device to output electrical signals indicative of the passage, in the proximity of the second and third Hall effect sensors, of a third magnetic element carried by the closing body in a position such as to result in the third magnetic element being in the proximity of the second Hall effect sensor when the closing body is in the ejection position, and of the third Hall effect sensor when the closing body is in the closing position, and a position sensor coupled to the second electric actuator to output an electrical position signal indicative of the axial position of the piston in the brewing chamber.

\* \* \* \* \*